United States Patent

[11] 3,573,872

[72] Inventor Harold A. Sannes
 South Dartmouth, Mass.
[21] Appl. No. 742,401
[22] Filed July 3, 1968
[45] Patented Apr. 6, 1971
[73] Assignee Acushnet Process Company

[54] SEALING WASHER
 1 Claim, 4 Drawing Figs.
[52] U.S. Cl. .................................................. 277/180,
 277/235
[51] Int. Cl. ...................................................... F16j 15/00
[50] Field of Search ........................................ 277/180,
 211, 235, 207, 208, 209

[56] References Cited
UNITED STATES PATENTS

| 2,992,151 | 7/1961 | Niessen | 277/235B |
| 2,795,444 | 6/1957 | Nenzell | 277/180 |
| 3,170,701 | 2/1965 | Hoover | 277/180 |
| 3,195,906 | 7/1965 | Moyers | 277/180 |
| 3,448,986 | 6/1969 | Jelinek et al. | 277/180 |

Primary Examiner—Samuel B. Rothberg
Attorney—Eyre, Mann and Lucas

ABSTRACT: A composite sealing device is formed by molding a resilient ring on a coined portion of the inner diameter of a washer. A mechanical bond is formed by the ring material extending through holes at the outer periphery of the coined portion of the washer. The holes are of such diameter as to permit cold flow of metal into the holes from the coined portion of the washer without completely filling the void of the holes.

PATENTED APR 6 1971
3,573,872
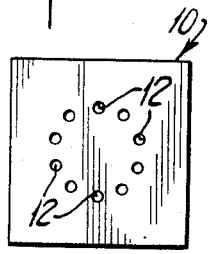
Fig. 1.
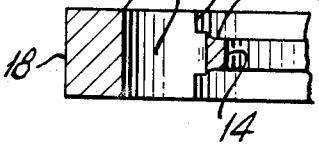
Fig. 2.
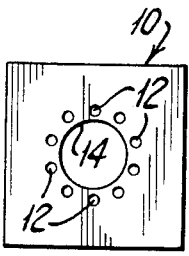
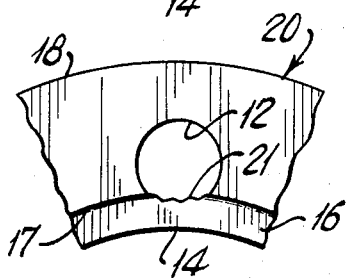
Fig. 3.
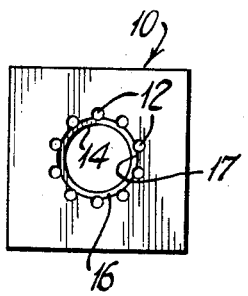
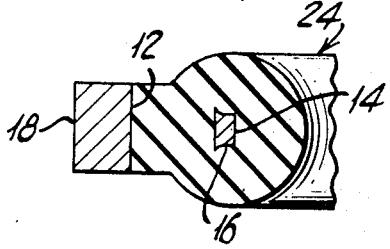
Fig. 4.
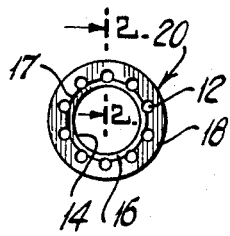
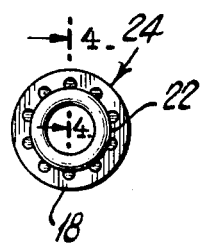
INVENTOR
HAROLD A. SANNES
BY
Eyre, Mann & Lucas
ATTORNEYS

SEALING WASHER

The present invention relates to improved sealing devices and the methods for making the devices. The sealing devices are composed of a perforated malleable washer with a resilient ring molded to its periphery. During the molding, the resilient material flows through the perforations or apertures, thereby forming a strong mechanical bond to the washer. Such a sealing device is useful in a number of applications, including leak-proof sealing against fluids and gases around bolts which extend through walls retaining the fluids or gases.

For a more complete understanding of the invention, reference should be made to the accompanying drawings in which:

FIG. 1 illustrates the various steps in the process of manufacturing one embodiment of the washer and the sealing device;

FIG. 2 is a sectional view through line 2-2 of FIG. 1D;

FIG. 3 is an enlarged plan view of a portion of the washer illustrating the cold flow of metal into the holes during the forming operation.

FIG. 4 is a sectional view through line 4-4 of FIG. 1E.

Referring now to FIG. 1A, the blank piece of malleable material 10 has a number of small holes 12 formed therein in a circular pattern. The next step, shown in FIG. 1B, consists of forming the inner periphery 14 of the washer by diecutting, drilling, or any other suitable method. The third step, shown in FIG. 1C, consists of coining a portion of the inner periphery 14, thereby forming a coined portion 16 which partially fills the apertures 12 by cold flow of the malleable material. This is achieved by extending the outer circumference 17 of the coined portion of the washer to a position just inside the void of the holes which are made large enough to accommodate the cold flow of metal as well as a portion of the resilient material as described hereinbelow. Cold flow of metal into the holes is of advantage in that it tends to preserve a smooth uniform inside circumference 14 which would otherwise break into jagged edges and lose the strength imparted by the continuous inside circumference.

The fourth step, shown in FIG. 1D, consists of forming the outer periphery 18 of the washer 20 by diecutting or some other suitable method. The fifth step, shown in FIG. 1E, consists of molding the resilient ring 22 to the inner periphery 14 to form the completed sealing device 24. During this step, the resilient material flows through the small apertures 12 to form a strong mechanical bond between the ring 22 and the washer 20.

Referring now to FIG. 2, a cross section of the finished washer 20 through one of the small apertures 12 is shown. The reduced thickness of the coined portion 16 is apparent. It may also be seen that the interface of the coined portion 16 and the aperture 12 has a thickness less than that of the main portion of the washer. As best shown in FIG. 3, the excess metal 21 from the coined portion of the washer flows into the void of the holes to form jagged edges which assist in bonding the resilient material in the holes. The coined portion also permits flow of the resilient material into the aperture 12 during the molding of the ring 22 to the coined portion 16.

Referring now to FIG. 4, a cross section of the completed sealing device 24 through one of the small apertures 12 is shown. It may be readily seen that the resilient ring 22 has an axial thickness greater than that of the washer 20 in the portion surrounding the coined portion 16 of the washer. The mechanical lock formed between the washer 20 and the ring 22 results from the flow of the resilient material into aperture 12, thereby surrounding the section of the coined portion 16 adjacent the aperture 12. It will be noted that the reduced thickness of the interface of coined portion 16 and aperture 12 enables the resilient material to completely surround that section of the coined portion 16 without having to form a thickness greater than that of the washer 20.

The advantages of the present invention will be apparent to those skilled in the art, as well as changes which could be made in the foregoing embodiments without departing from the spirit and scope of the invention. Therefore, it should be understood that the present invention is not to be limited to the foregoing description of the specific embodiments thereof.

I claim:
1. A composite sealing device comprising:
   1. a malleable washer having an annular main body;
      i. a central opening defined by a continuous inner circumferential peripheral surface;
      ii. a plurality of apertures disposed in said washer and spaced about said central opening;
      iii. a portion of said main body being of reduced axial thickness and extending radially outwardly from said central opening and into each of said apertures to form jagged edge portions along each interface between said apertures and said portion of reduced axial thickness; and
   2. a resilient sealing ring disposed on and surrounding said portion of reduced axial thickness and extending through said plurality of apertures, wherein said resilient sealing ring is in engagement with and retained by said jagged edge portions of said plurality of apertures.

UNITED STATES PATENT OFFICE
CERTIFICATE OF CORRECTION

Patent No. 3,573,872            Dated April 6, 1971

Inventor(s)        Harold A. Sannes

It is certified that error appears in the above-identified patent and that said Letters Patent are hereby corrected as shown below:

Column 1, line 5, before "periphery" insert -- inner --.

Signed and sealed this 14th day of September 1971.

(SEAL)
Attest:

EDWARD M. FLETCHER, JR.          ROBERT GOTTSCHALK
Attesting Officer                Acting Commissioner of Patent